United States Patent Office 3,255,133
Patented June 7, 1966

3,255,133
POLYMERIZABLE FATTY COMPOUNDS BEARING VICINAL HALOGEN-ACRYLOXY-GROUPS
Charles S. Nevin, Decatur, Ill., assignor to A. E. Staley Manufacturing Company, Decatur, Ill., a corporation of Delaware
No Drawing. Filed Jan. 18, 1962, Ser. No. 167,153
29 Claims. (Cl. 260—23)

This invention relates broadly to polymerizable vicinal acryloxy-halo long chain organic compositions of matter and addition polymers thereof. More specifically, it relates to such polymerizable compositions, and addition polymers thereof, having at least one aliphatic chain of 10 to 24 carbon atoms which includes at least one internal vicinal acryloxy-halo segment with the general structure:

$$-\underset{\underset{X}{|}}{CH}-\underset{\underset{Q}{|}}{CH}-$$

where X is halogen and Q is an unsubstituted acryloxy group, $$-O-\underset{\underset{}{\overset{O}{\|}}}{C}-CH=CH_2$$

or a substituted acryloxy group of limited substitution as described hereinafter.

An important object of the invention is to provide new compositions of matter capable of addition polymerization through component acryloxy groups. Another object is to provide new and useful addition polymers of the new compositions. A further object is to provide new polymerizable compositions derived from natural glyceride oils and addition polymers of the new compositions. Additional objects of the invention will appear hereinafter.

The acryloxy groups of the new compositions of this invention are represented by the general structure:

$$-O-\underset{\underset{}{\overset{O}{\|}}}{C}-\underset{\underset{A}{|}}{C}=\underset{\underset{Y}{|}}{C}H$$

In this structure, Y is preferably hydrogen or $$-\underset{\underset{}{\overset{O}{\|}}}{C}-O-R_1$$

$R_1$ being an organic radical of 1 to 18 carbon atoms. When Y is hydrogen, A is preferably hydrogen, halogen, alkyl of 1 to 4 carbon atoms, alkoxy of 1 to 4 carbon atoms, phenyl, benzyl or $$-CH_2-\underset{\underset{}{\overset{O}{\|}}}{C}-O-R_1$$

$R_1$ having the above meaning. When Y is $$-\underset{\underset{}{\overset{O}{\|}}}{C}-O-R_1$$

A is preferably hydrogen, halogen or alkyl of 1 to 4 carbon atoms. The following specific acryloxy groups are illustrative examples of the foregoing general structure:

$$-O-\underset{\underset{}{\overset{O}{\|}}}{C}-CH=CH_2$$

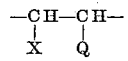

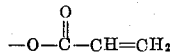

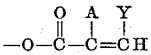

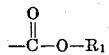

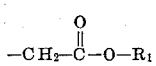

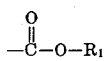

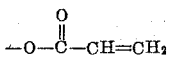

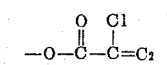

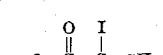

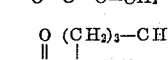

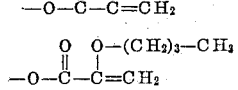

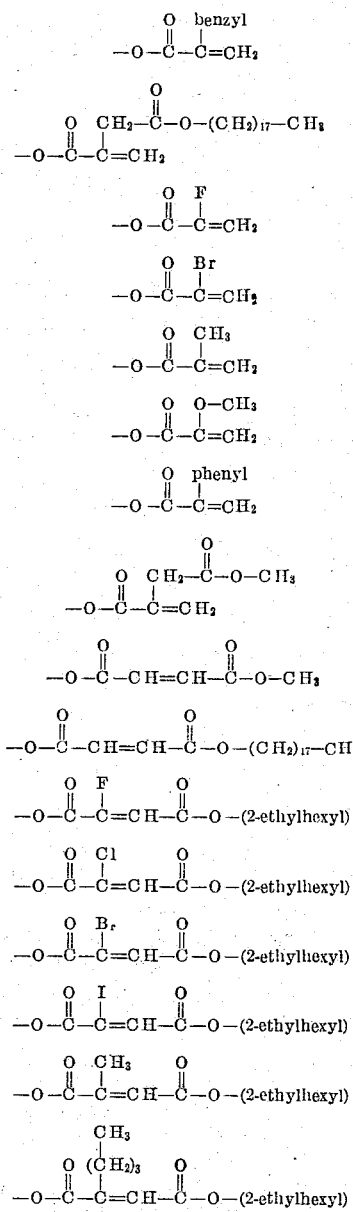

As stated earlier, an essential structural feature of the new polymerizable compositions of this invention is at least one aliphatic chain of 10 to 24 carbon atoms having at least one internal two-carbon segment substituted with halogen and acryloxy groups as set forth above. The derivatives of methyl stearate represented by the following two structural formulas are illustrative examples of the polymerizable compositions embraced by this invention.

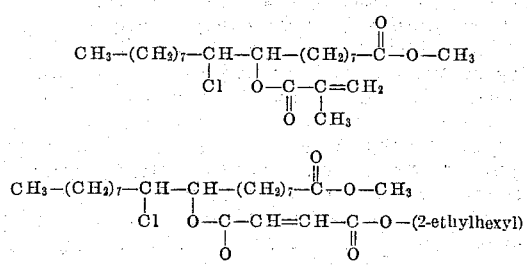

Polymerizable compositions contemplated by this invention may be conveniently prepared from natural organic materials containing the necessary long aliphatic chains. For example, fats containing substantial proportions of unsaturated acid radicals of required chain length are suitable raw materials. As described hereinafter, at least one of the vinylene segments (—CH=CH—) of an unsaturated aliphatic chain of required length in a compound of the starting material is converted into the vicinal acryloxy-halo segment,

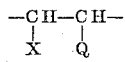

The following animal and vegetable oils are examples of natural unsaturated triglyceride oils that are suitable starting materials for preparation of vicinal acryloxy-halo compounds and compositions included by this invention: soybean, corn, cottonseed, hempseed, safflower, peanut, linseed, rice bran, tobacco seed, olive, perilla, sesame, sunflower seed, tung, castor, cashew nut, rapeseed, cod, herring, and menhaden. Unsaturated fatty acids of required chain length derived from the above oils, or from tall oil, are also suitable raw materials.

The foregoing unsaturated fatty raw materials may be converted by known methods into corresponding unsaturated carboxylate derivatives which are also suitable raw materials for preparation of the polymerizable compounds and compositions of this invention. The carboxylate derivatives are those obtained by replacing the carboxyl group of a free acid, R'—COOH, or the ester groups of a glyceride oil,

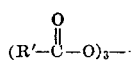

glyceryl, with other groups. Among such carboxylate derivatives are amides (R''—CONH$_2$), amines (R'—CH$_2$NH$_2$)

alcohols (R'—CH$_2$OH), nitriles (R'—CN) and esters of monohydric alcohols (R'—COOR''). One or both hydrogens in the amido and the amino groups may be replaced with alkyl or aryl groups to provide suitable raw material substituted amides and amines, respectively. Also, the hydroxyl hydrogens of the alcohols may be replaced with alkyl or aryl groups to provide suitable raw material ethers. All of the carboxylate derivative raw materials may be converted to polymerizable vicinal acryloxy-halo compounds of this invention, as described later, by appropriate reaction at one or more of the component long chain vinylene segments, —CH=CH—.

From the standpoints of product stability and raw material cost and abundance, the preferred broad class or type of vicinal acryloxy-halo compound or composition is the ester-class, i.e., the class derived from raw material esters containing at least one unsaturated carbon chain of required length. Within this preferred broad class, the preferred sub-class of polymerizable compositions embraced by this invention is the class derived from unsaturated natural fats.

Carboxylic acids, ether natural or artificial, having an ethylenically unsaturated chain of 10–24 carbon atoms may be esterified with a wide variety of alcohols—monohydric, polyhydric, aliphatic or aromatic. Also, alcohols having an ethylenically unsaturated chain of 10–24 carbon atoms, e.g., oleyl alcohol, may be esterified with a wide variety of carboxylic acids. It is evident that the ester-class of polymerizable vicinal acryloxy-halo compositions of this invention includes a large number of structurally diverse members. This class includes partial carboxylic esters of polyhydroxy alcohols having one or more residual hydroxyl groups. The following compound derived from glycerol dioleate is an example of such partial ester:

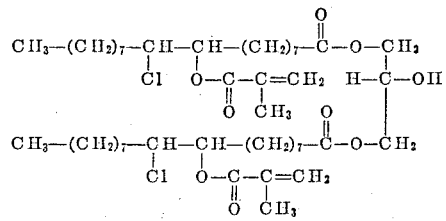

The ester-class of polymerizable compounds contemplated by this invention may be represented by the general formula:

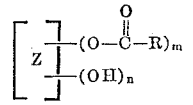

In this general formula $m$ and $n$ are integers including zero whose sum is the number of valences in the Z radical or the number of hydroxyl groups in the organic hydroxide from which the ester may be regarded as derived, $m$ ranges from 0 to the sum of $m$ and $n$, $n$ ranges from 0 to one less than the sum of $m$ and $n$, Z is a monovalent or polyvalent organic radical, R is a monovalent organic radical, and at least one of the Z and R radicals has at least one aliphatic chain of 10–24 carbon atoms which includes at least one internal vicinal acryloxy-halo segment with the structure

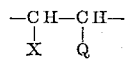

where X is halogen and Q is unsubstituted acryloxy or substituted acryloxy as described above.

Alkyl hydroxides or alcohols which can provide the Z radical of the foregoing general formula may be saturated or unsaturated. They may be open chain compounds such as n-butanol, glycerol and sorbitol, or cyclic compounds, such as furfuryl alcohol, cyclohexanol, and inositol. Among the suitable members are the saturated monohydric alcohols ranging from methyl to lignoceryl, including the many branched chain isomers and the primary, secondary and tertiary alcohols. Among the many suitable dihydric alcohols are ethylene glycol, methylene glycol and the polyoxyalkylene glycols having 1 to 3 carbon atoms in each oxyalkylene group, i.e., the polymethylene glycols, the polyethylene glycols and the polypropylene glycols. Suitable higher polyhydric alcohols are pentaerythritol, arabitol, trimethylolethane and trimethylolpropane. Oleyl and linoleyl alcohols are suitable unsaturated alcohols.

Examples of aryl hydroxides which can provide the Z radical of the foregoing general formula are phenol, p-cresol, resorcinol, thymol, and 1-naphthol. Benzyl alcohol is an example of a suitable aralkyl hydroxide.

Specific examples of organic radicals, Z, in the foregoing general formula are phenyl, benzyl, tolyl (o, m, p), meta-phenylene (resorcinyl), furfuryl, glyceryl, cyclohexyl, pentaerythrityl, arabityl, inosityl, sorbityl, ethylene, butylene, hexamethylene, dodecamethylene, methyl, ethyl, n-butyl, 2-ethylhexyl, dodecyl, stearyl, oleyl, linoleyl,

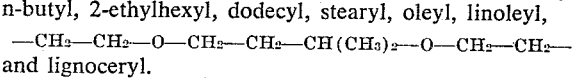
and lignoceryl.

Specific examples of the R radical in the foregoing general ester formula are methyl, ethyl, n-butyl, 2-ethylhexyl, dodecyl, stearyl, lignoceryl, oleyl, linoleyl, phenyl, benzyl, p-tolyl, furfuryl, cyclohexyl, ricinoleyl and 9,10-dichlorooctadecyl.

From the foregoing description, it will be seen that the polymerizable vicinal acryloxy-halo compounds of this invention include members of the following classes of compounds, the classification being based on the presence of non-hydrocarbon groups carried over from convenient vinylene unsaturated long chain raw material compounds: esters of carboxylic acid, amides of carboxylic acids, carboxylic acids, amines, alcohols, nitriles, and ethers. Additionally, the new polymerizable compounds of this invention include members of the following classes: mercaptans, isocyanates, quaternary ammonium halides and salts of carboxylic acids with metal oxides, metal hydroxides, amines and quaternary ammonium hydroxides.

Unsubstituted and halogen substituted alkenes of required chain length are also suitable raw materials for preparation of the vicinal acryloxy-halo compounds.

As indicated earlier, the polymerizable compounds of this invention may contain more than one aliphatic chain of 10–24 carbons which includes more than one of the required vicinal acryloxy-halo segments. They may also contain vicinal epoxy segments

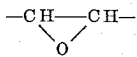

vinylene segments, —CH=CH—, and halogen substituents other than those vicinal to the required acryloxy group or groups.

Another class of polymerizable compositions contemplated by this invention comprises those having one or more molecular crosslinks selected from the group of diether linkages, diamino linkages and diester linkages. Members of this class of compositions may be obtained, for example, by appropriate reaction of a dihydroxy alcohol, a diamino amine or a dicarboxylic acid, respectively, with two molecules of the defined long chain acryloxy-halo compounds, each of which has at least one vicinal epoxy segment

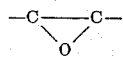

or with one molecule of the long chain compound having at least two vicinal epoxy segments. The crosslinked compounds may be homopolymerized or copolymerized in the same general manner as the non-crosslinked compounds to provide useful polymers.

Addition polymers of the non-crosslinked polymerizable compounds having vicinal epoxy segments may also be usefully modified by the foregoing crosslinking methods.

Examples of the new polymerizable compounds derived from the methyl ester of oleic acid (cis form of 9-octadecenoic acid) are represented by the following structural formulas in which $R_2$ is $CH_3-(CH_2)_7-$ and $R_3$ is

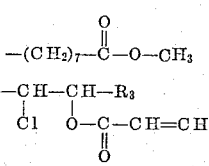

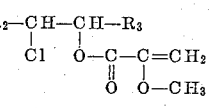

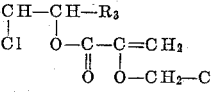

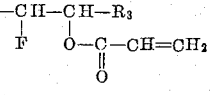

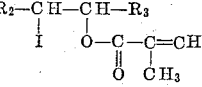

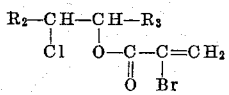

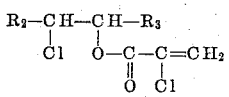

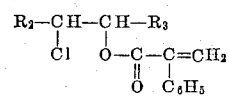

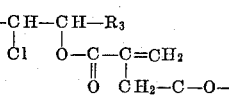

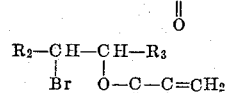

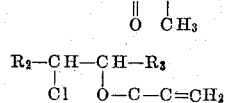

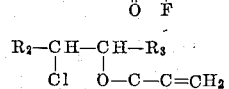

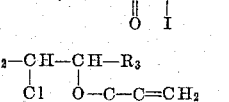

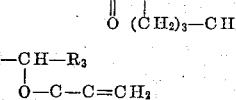

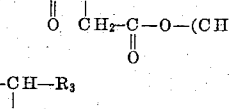

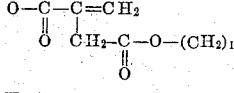

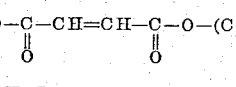

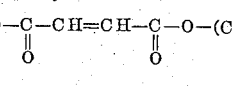

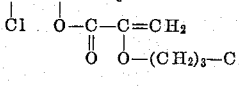

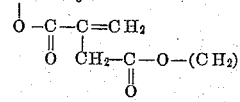

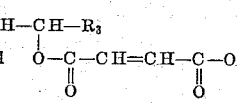

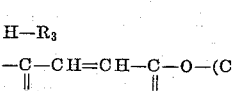

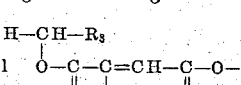

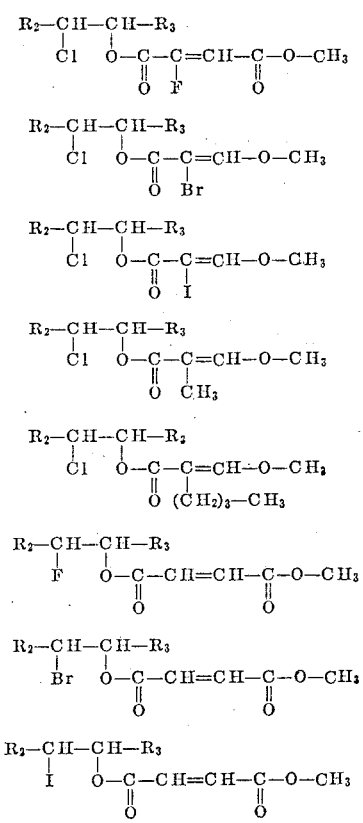

Additional illustrative examples of the new polymerizable compositions are those derived from a natural unsaturated glyceride oil such as refined soybean oil. Refined soybean oil consists essentially of a mixture of triglycerides of two saturated and three unsaturated higher fatty acids. The saturated acids are palmitic and stearic; the unsaturated acids are oleic, linoleic and linolenic. The unsaturated acids predominate almost 9 to 1 by weight and typical iodine and saponification numbers of the oil are about 130 and 191, respectively. The average glyceride molecular weight is 881 (3000×gm. mol. wt. of KOH÷saponification number) and the average number of vinylene chain segments (CH=CH—) per molecule is (iodine number×molecular weight)÷(100×molecular weight of iodine)=4.5 approximately. The saponification and iodine numbers are satisfied by representing refined soybean oil as a mixture of equal parts by weight of linoleodiolein and oleodilinolein.

The number of different individual vicinal acryloxy-halo compounds derivable from an unsaturated glyceride oil such as soybean oil is large. The positioning of the halogen and acryloxy substituents in the palmityl radical, for example, may be either 9, 10 or 10, 9. The number of vincinal acryloxy-halo substitutions in a particular soybean oil glyceride molecule may be as low as one and as high as five. Positioning of the fatty acid radicals on the glycerol carbon atoms may also be varied. For example, the two oleyl radicals in linoleodiolein may be attached to adjacent carbon atoms or to the end carbon atoms. Furthermore, the halogen and acryloxy groups of the vicinal acryloxy-halo substitution may vary within the foregoing described limits.

The physical and chemical characteristics of the polymerizable compositions of this invention, and particularly the physical properties of the polymers and resins derived therefrom, can be altered substantially by choice of the acryloxy and other substituents, by choice of the number and length of the long aliphatic chains, by choice of molecular weight and structural complexity of the new polymerizable composition and by choice of kind and proportion of conventional polymerizable compound with which the new composition is copolymerized.

The polymerizable compositions of this invention may be copolymerized by conventional techniques with vinyl monomers and other polymerizable vinyl compounds or with non-vinyl ethylenically unsaturated compounds to yield useful products ranging from viscous liquids through soft gels to tough rubbery materials and hard resins. Examples of vinyl monomers which may be thus copolymerized with the polymerizable compositions of this invention are methyl methacrylate, ethyl acrylate, butyl methacrylate, stearyl acrylate, acrylic acid, methacrylic acid, styrene, methyl styrene, allyl alcohol, vinyl acetate, vinyl stearate, acrylonitrile, butadiene, and acrylamide. Examples of copolymerizable non-vinyl ethylenically unsaturated compounds are maleic acid, fumaric acid, crotonic acid, cinnamic acid, dipentene, myrcene, monoethyl maleate, di-n-butyl maleate, and mono-ethyl fumarate.

The polymerizable compositions of this invention having a vinyl group, —CH=CH$_2$, may also be homopolymerized with known catalysts to form useful homopolymers ranging from viscous liquids to hard and tough solids.

The addition polymers of this invention are useful broadly as protective coatings, as sizing agents and additives in textile and paper products, as laminating resins, as casting resins, as potting resins, as stabilizers and/or plasticizers and adhesives.

The preferred polymerizable compositions of this invention are liquid at 25° C. Many can be addition polymerized at this temperature with suitable catalysts, and the initial liquid condition of the reaction mixture is convenient. The polymerizable compositions of this invention are not restricted, however, to those which are liquid at 25° C. Those which are solid at this temperature are useful, in part, because they can either be melted and polymerized at higher temperatures or dissolved in an inert liquid medium or in a liquid monomer such as styrene or methyl methacrylate and then polymerized.

The polymerizable vicinal acryloxy-halo long chain compositions of this invention may be prepared by one or more of the following methods:

(1) Reaction of an appropriate vicinal epoxy long chain composition with an appropriate acyl halide. An example of this method is the reaction of 9,10-epoxy methyl oleate with acrylyl chloride to yield a mixture of methyl 9-acryloxy-10-chlorostearate and methyl 9-chloro-10-acryloxystearate.

(2) Reaction of an appropriate ethylenically unsaturated long chain composition with an appropriate acrylic acid,

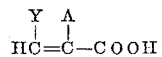

and a suitable tertiary alkyl hypohalite. An example of this method is the reaction of methacrylic acid with the 2-ethylhexyl ester of oleic acid in the presence of tertiary butyl hypochlorite to yield a mixture of the 2-ethylhexyl esters of 9-methacryloxy-10-chlorostearic acid and 9-chloro-10-methacryloxystearic acid. A second example of this method is the reaction of mono-n-butyl fumarate with the same ester of oleic acid and tertiary butyl hypochlorite to yield a mixture of the following two compounds:

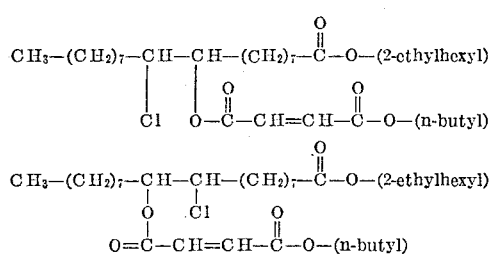

(3) Reaction of an appropriate ethylenically unsaturated long chain composition with an appropriate acrylic acid,

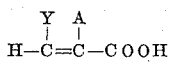

and free halogen in the presence of an alkaline catalyst. An example of this method is the reaction of a mixture of methyl oleate, calcium acrylate, acrylic acid and tetramethylammonium chloride with chlorine to yield a mixture of the methyl esters of 9-acryloxy-10 chlorostearic acid and 9-chloro 10 acryloxystearic acid.

Addition of the appropriate acrylic acid to the appropriate unsaturated long chain composition in the presence of a suitable tertiary alkyl hypohalite is the preferred method. It has two advantages over the acyl halide method: one, the unsaturated long chain materials are less expensive than the corresponding epoxy compositions, the latter being generally derived from the former, and two, the free acrylic acids,

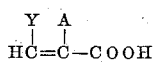

are less expensive than the corresponding acid halides,

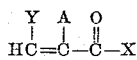

It has one principal advantage over the free halogen method: the yields of desired acryloxy halo compositions are higher.

The following compounds are representative of the appropriate acrylic acids referred to in foregoing methods 2 and 3: acrylic acid, methacrylic acid, ethacrylic acid; alpha-chloroacrylic acid; alpha-bromoacrylic acid, alpha-phenylacrylic acid; alpha-iodoacrylic acid; alpha-benzylacrylic acid; alpha-propoxyacrylic acid; methyl hydrogen itaconate; methyl hydrogen maleate; methyl hydrogen fumarate; methyl hydrogen mesaconate; methyl hydrogen citraconate; ethyl hydrogen maleate; ethyl hydrogen fumarate; n-propyl hydrogen maleate; isopropyl hydrogen fumarate; n-butyl hydrogen maleate; tertiary-butyl hydrogen fumarate; isoamyl hydrogen fumarate; 4-methyl-2-pentyl hydrogen fumarate; n-octyl hydrogen maleate; 2-ethyl-hexyl hydrogen fumarate; decyl hydrogen fumarate; lauryl hydrogen maleate; n-tridecyl hydrogen maleate; stearyl hydrogen fumarate; octyldecyl hydrogen maleate; phenyl hydrogen maleate; p-cresyl hydrogen fumarate; benzyl hydrogen maleate; naphthyl hydrogen fumarate; ethyl hydrogen chlorofumarate; cyclohexyl hydrogen maleate; p-cresyl hydrogen maleate; p-chlorophenyl hydrogen maleate; ethoxyethyl (Cellosolve) hydrogen fumarate; p-decylphenyl hydrogen maleate; allyl hydrogen maleate; allyl hydrogen fumarate; etc.

The polymerizable compounds of this invention in which the Y substituent of the acryloxy group is

yield copolymers, particularly with styrene, whose physical properties can be modified over rather wide ranges by selection of the $R_1$ group. This is a commercially useful characteristic of the compounds. For example, when the polymerizable compound is a derivative of soybean oil wherein the halo group of the vicinal acryloxy-halo substitution is chlorine and the acryloxy group is

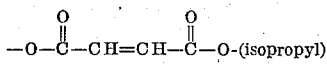

its copolymers with styrene are more rigid than those in $R_1$ is a higher alkyl group, e.g. 2-ethylhexyl. Also, when $R_1$ is aryl, e.g., phenyl, the copolymers with styrene are harder than those in which $R_1$ is alkyl of about the same molecular weight. Since acryloxy groups of the type

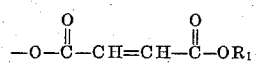

are conveniently derived from half esters of maleic and fumaric acids, both of which groups of half esters are easily derivable by known means from maleic anhydride and appropriate organic hydroxide, the compounds of this invention based on the malenoid and fumaroid acryloxy groups are sometimes cheaper than those based on the vinyl acryloxy groups. Copolymers of the fumaroid polymerizable compounds of this invention are preferred over the corresponding malenoid copolymers because of generally higher tensile strentgh.

This invention includes (1) the separate molecular species of the defined vicinal acryloxy-halo long chain compounds, (2) mixtures of such molecular species, (3) the separate or mixed species together with compatible other materials, particularly unreacted starting materials and side reaction products, and (4) addition polymers of (1), (2), and (3).

The following examples illustrate the invention and describe convenient methods of preparing polymerizable compositions and addition polymers thereof which are specific embodiments of the invention.

EXAMPLE I

One hunderd and seventy-four grams (2 moles) of methacrylic acid containing 0.025% by weight p-methoxy phenol and 204 grams of soybean oil (1.00 equivalents of ethylenic unsaturation were weighed into a Morton flask equipped with a stirrer, thermometer, reflux condenser and dropping funnel with an inlet tube extending to the bottom of the flask. One hundred and twelve grams of 97% pure tertiary butyl hypochlorite (1.0 mole) was added gradually from the dropping funnel over a 15 minute period to the stirred reaction mixture, while cooling the reaction mixture to hold its temperature at 40° C. Stirring at the same temperature, with heating as required, was continued for 5 hours. A small sample of the product, which weighed a total of 490 grams, was put aside for analysis. The reaction mixture was diluted with an equal volume of hexane and repeatedly washed with 50 ml. portions of 10% aqueous disodium phosphate until a test washing with distilled water showed no residual free acid. The alkaline washing also removed by-product tertiary butyl alcohol from the hexane solution of the reaction product. The hexane was then vacuum stripped off yielding 312 grams of a clear, light yellow oil.

The samples, identified as A, the untreated reaction product and C, the alkali washed product, were analyzed for vinyl unsaturation, total unsaturation, chlorine and acidity. Vinyl unsaturation was determined by a near infra-red absorption band method (NIR) as described by R. F. Goddu at page 1790 in volume 29 of "Analytical Chemistry." The total ethylenic unsaturation was determined by the pyridine sulfate dibromide method described at page 203 of the 1954 edition of "Monomeric Acrylic Esters," by E. H. Riddle.

The analytical data are collected in the following Table I:

*Table 1*

| Determination | Product | |
|---|---|---|
| | A | C |
| Acidity, meq./g | 2.67 | 0.04 |
| Chlorine, meq./g | 2.10 | 3.23 |
| NIR Total Terminal Unsaturation, meq./g | 4.00 | 2.09 |
| Total Unsaturation | Not run | 2.57 |

From the above data it was calculated that 65.2 mole percent of the ethylenic double bonds in the soybean oil were now substituted with vicinal methacryloxy-chloro groups 15 mole percent of the ethylenic double bonds in the soybean oil were allylic chloride groups and that 19.8 mole percent of the ethylenic double bonds in the soybean oil were now substituted with vicinal butoxy-chloro groups.

EXAMPLE 2

Example 1 was repeated except that 1.7 moles of methacrylic acid was used instead of 2.0 moles and the reaction was run for 2 hours instead of 5 hours. Before the alkaline extraction was carried out, the sample was vacuum distilled at 25 min. Hg pressure and 50° C. to remove all the tertiary butyl alcohol and some of the unreacted methacrylic acid. The sample was identified as product B.

Analytical data on sample B are shown in the following Table 2:

*Table 2*

| Determination | Product | | |
|---|---|---|---|
| | A | B | C |
| Weight, grams | 434 | 354 | 307 |
| Acidity, meq./g | 2.40 | 1.97 | 0.03 |
| Chlorine, meq./g | 2.34 | 2.83 | 3.28 |
| NIR Total Vinyl in meq./g | 4.14 | 4.35 | 2.38 |
| Total Unsaturation, meq./g | 4.19 | 4.44 | 2.69 |

From the above data it was calculated that 72.2 mole percent of the ethylenic double bonds in the soybean oil had vicinal methacryloxy and chloro substituents, 8.8 mole percent of the ethylenic double bonds in the soybean oil were allylic chloride groups, and that 19 mole percent of the ethylenic double bonds in the soybean oil had vicinal butoxy and chloro substituents.

EXAMPLE 3

Example 1 was repeated except that acrylic acid was used instead of methacrylic acid. Sixty-one and nine-tenths mole percent of the ethylenic double bonds in the soybean oil were converted to vicinal carbons substituted with acryloxy and chloro groups.

EXAMPLE 4

Ninety-six and four-tenths grams of acrylic acid (1.32 moles) containing 0.02% by weight p-methoxy phenol and 300 grams of soybean oil (1.50 equivalents of ethylenic unsaturation) were weighed into a Morton flask equipped with a stirrer, thermometer, reflux condenser and dropping funnel with an inlet tube extending to the bottom of the flask. One hundred and sixty-eight grams of 97% pure tertiary butyl hypochlorite (1.5 mole) was added gradually from the dropping funnel over a 15-minute period to the stirred mixture, while cooling the reaction mixture to hold its temperature at 65–70° C. Stirring at the same temperature, with heating as required, was continued for 85 minutes. A total of one hundred and twenty grams of tertiary butyl alcohol and unreacted acrylic acid was vacuum distilled off at 50 mm. pressure.

Analyses of a small sample of the vacuum stripped product showed 0.23 meq./gram acidity, 55.2% conversion of original vinylene groups to vicinal acryloxy-chloro groups, 21.3% conversion of original vinylene groups to vicinal tertiary butoxy-chloro groups and 18.6% conversion of the original vinylene groups to vicinal allyl-chloro groups. The product (444 grams) was copolymerized with 135 grams of styrene using 1% benzoyl peroxide. The copolymer had tensile strength of 1970 pounds per square inch.

EXAMPLE 5

One and one-half moles of maleic anhydride (147 grams) was weighed into a flask equipped with a stirrer, thermometer, condenser and dropping funnel, and then heated to 105° C. One and one-half moles of methanol (48 grams) was added slowly from the dropping funnel while maintaining the temperature of the reaction mixture at 90–100° C. When sufficient heat was being generated by the reaction, the external heating was discontinued and the temperature rose to 135–140° C. The reaction mixture was allowed to cool to 100° C. and maintained at this temperature for 1 hour. An analytical sample of the reaction product had an acid value of 7.58 meq./g. (theoretical 7.70 meq./g.) and a saponification value of 15.34 meq./g. (theoretical 15.40 meq./g.). Infra-red spectrophotometric analyses indicated than an essentially pure half-ester of maleic acid had been prepared. Sixty-eight hundredths of a gram of $PCl_3$ (0.005 mole) was added to the reaction mixture, while maintaining the reactants at 110° C. for 12 minutes. Infra-red spectrophotometric analysis indicated that 95% of the maleic acid half-ester had been isomerized to the fumarate half-ester.

(A) Twenty-six grams of the methyl hydrogen fumarate (0.2 mole), 40 grams soybean oil (0.2 equivalent) and 0.01 wt. percent p-methoxyphenol was heated to 65° C. in a Morton flask equipped with a stirrer, thermometer, reflux condenser and dropping funnel with an inlet tube extending to the bottom of the flask. Twenty-two and one-half grams of tertiary butyl hypochlorite (0.2 mole) was added gradually to the reaction mixture, while cooling to maintain 65° C. The reaction was continued at this temperature for 60 minutes. The product weighed 110.6 grams.

(B) A second sample weighing 74.6 grams was prepared by the method of part (A) except that the volatiles were removed by vacuum distillation at 50 mm. pressure.

A portion of product (B) was mixed with 33% by weight styrene, 1% Adbastab B–C–105 heat stabilizer and 1% benzoyl peroxide and placed in an aluminum weighing cup. By covering with a second weighing disk, a 2-inch diameter circular mold was formed. Polymerization at 80° C. for 6 hours produced a ⅛ inch thick polymer casting.

EXAMPLE 6

Example 5 was repeated except that the isomerization step was omitted.

EXAMPLE 7

The ethyl half-ester product was prepared using the method and mole proportion of reactants of Example 5 except that the half-ester was isomerized at 80° C. for 10 minutes using 0.33 weight percent thionyl chloride.

EXAMPLE 8

Example 7 was repeated except that the isomerization step was omitted.

EXAMPLE 9

The isopropyl half-ester product was prepared using the method and mole proportion of reactants of Example 5 except that the half-ester was isomerized at from 60–80° C. for 30 minutes using 2.0 weight percent thionyl chloride and the haloacylation was carried out at 40° C. over a 90 minute period.

EXAMPLE 10

Example 9 was repeated except that the isomerization step was omitted.

EXAMPLE 11

The n-propyl half-ester product was prepared using the method and mole proportion of reactants of Example 5 except that the half-ester was isomerized at 90–100° C. for 10 minutes using 1.0 weight percent thionyl chloride and the haloacylation was carried out at 55° C. over a 60-minute period.

EXAMPLE 12

The isobutyl half-ester product was prepared using the method and mole proportions of reactants of Example 5 except the half-ester was isomerized at 85° C. for 15 minutes using 0.28 weight percent thionyl chloride and the haloacylation was carried out at 60° C. over a 90-minute period.

EXAMPLE 13

The secondary butyl half-ester product was prepared using the method and mole proportions of reactants of Example 5 except that the half-ester was isomerized at 100° C. for 30 minutes using 0.28 weight percent thionyl chloride and the haloacylation was carried out at 45° C. over a 140-minute period.

EXAMPLE 14

The allyl half-ester product was prepared using the mething and proportions of reactants of Example 5 except that the half-ester was isomerized at 90–100° C. for 30 minutes using 0.50 weight percent $PCl_3$ as the isomerization catalyst and the haloacylation was carried out at 65° C. over a 75-minute period.

In the following Table 3 are collected analytical data on the polymerizable compositions of Examples 5–14 inclusive and properties of the corresponding styrene copolymers.

adjusted to 65° C. One hundred and twelve grams of 97% pure tertiary butyl hypochlorite (1.0 mole) was immediately added to the reaction mixture over a period of 20 minutes, while maintaining the reaction mixture at 65° C. The product was isolated by the method of Example 5(B) and then copolymerized with 30% by weight styrene in the same manner.

EXAMPLE 16

The 2-ethylhexyl half-ester reaction product was prepared using the method and proportions of Example 15.

EXAMPLE 17

The tridecyl half-ester reaction product was prepared using the method and proportions of Example 15.

Analytical data on the polymerizable compositions of Examples 15, 16, and 17, and tensile strength of the corresponding copolymers with 30% styrene are collected in following Table 4:

*Table 4*

| Example | Percent Trans Isomer | Wt. of Smpl. in Grams | Acidity in meq./g. | Percent Ethylenic Gps. In Oil Subst. With Vicinal Acryloxy and Chloro Gps. | Percent Ethylenic Gps. In Oil Subst. With Vicinal Acryloxy and Chloro Gps. | Tensile Strength Polymer Casting, p.s.i. |
|---|---|---|---|---|---|---|
| 15 | 100 | A 504<br>B 437 | A 0.90<br>B 0.99 | 56.8 | 17.7 | 383 |
| 16 | 100 | A 532<br>B 478 | A 0.83<br>B 0.91 | 56.4 | 17.4 | |
| 17 | 100 | A 607<br>B 544 | A 0.75<br>B 0.80 | 56.5 | 33.7 | 274 |

EXAMPLE 18

Four hundred and fifty-three grams of castor oil (1.5 equivalents of ethylenic unsaturation), 220.8 grams of

*Table 3*

| Example | Percent Trans Isomer | Weight of Sample in Grams | Acidity in meq./g. | Percent of Ethylenic Groups in Oil Substituted with Vicinal Acryloxy and Chloro Groups | Description of Polymer Casting |
|---|---|---|---|---|---|
| 5 | 95 | A 110.6<br>B 74.6 | A 0.91<br>B 1.31 | 48.9 | Clear, med. hard, flexible tough. |
| 6 | 0 | A 87.4<br>B 75.1 | A 0.90<br>B 0.95 | 64.1 | Cloudy, soft, flexible. |
| 7 | 100 | A 89<br>B 77.8 | A 0.95<br>B 1.04 | 59.5 | Med. soft, flexible. |
| 8 | 0 | A 89<br>B 74.2 | A 0.86<br>B 0.99 | 63.25 | Cloudy, soft, flexible. |
| 9 | 100 | A 93.4<br>B 80.7 | A 1.01<br>B 1.12 | 54.9 | Clear, hard rigid, tough. |
| 10 | 0 | A 91.6<br>B 78.0 | A 0.91<br>B 0.99 | 61.4 | Cloudy, soft flexible. |
| 11 | 100 | A 95.2<br>B 86.5 | A 1.04<br>B 1.14 | 50.8 | Clear, hard, rigid, tough. |
| 12 | 100 | A 95.2<br>B 87.8 | A 1.02<br>B 1.21 | 50.3 | Cloudy, soft weak. |
| 13 | 98 | A 95.2<br>B 82.1 | A 0.74<br>B 0.81 | 35.3 | Clear, med. hard, slight flexible. |
| 14 | 100 | A 92.0<br>B 83.6 | A 0.90<br>B 1.05 | 44.0 | Cloudy, soft weak, flexible. |

EXAMPLE 15

One mole of maleic anhydride (98 grams) was weighed into a Morton flask equipped with a stirrer, thermometer, reflux condenser and dropping funnel with an inlet tube extending to the bottom of the flask. One mole of methyl amyl alcohol (4-methyl-2-pentanol) (102 grams) was added slowly over 35 minutes from a dropping funnel while maintaining the reaction mixture at 110° C. Sixty-eight hundredths of a gram of $PCl_3$ (0.005 mole) was added to the reaction mixture while maintaining the reactants at 110° C. for 10 minutes. Immediately thereafter, two hundred grams of soybean oil (1.0 equivalents of ethylenic unsaturation) was added to the reaction mixture and the temperature of the reaction mixture was methacrylic acid (2.55 moles) containing 0.075% by weight p-methoxy phenol and 163.9 grams of 99% pure tertiary butyl hypochlorite (1.5 moles) were reacted for 90 minutes at 45° C. The reaction mixture was stripped at 25 mm. and 50° C. to remove the tertiary butyl alcohol by-product. Acidity and infra-red spectrophotometric analysis of the sample showed 42.5 mole percent of the oil unsaturation had been converted to the vicinal methacryloxy-chloro derivative. Further analysis indicated that 30 mole percent of the oil unsaturation was allylic chloro groups and that 22 mole percent of the oil unsaturation had vicinal butoxy-chloro substituents.

The stripped product was copolymerized with 33% by weight styrene, using 1% benzoyl peroxide and 1% barium-cadmium carboxylate at 65° C. for 4 hours. The cast sheet was yellow, slightly opaque, semi-hard and slightly flexible.

EXAMPLE 19

Thirty-six and one-fourth grams of menhaden oil (0.25 equivalent of ethylenic unsaturation), 36.55 grams of methacrylic acid (0.425 mole) containing 0.02% by weight p-methoxy phenol and 27.1 g. of 99.6% pure tertiary butyl hypochlorite (0.25 mole) were reacted for 90 minutes at 65° C. The reaction mixture was stripped at 25 mm. pressure and 50° C. Acidity and infra-red analysis showed 46.7 moles percent of the oil unsaturation had vicinal methacryloxy and chloro substituents. Further analysis indicated that 14 mole percent of the oil unsaturation was allylic chloro groups and that 30 mole percent of the oil unsaturation had vicinal butoxy and chloro substituents. A copolymer with 33% by weight styrene was reddish brown, transparent, hard and brittle.

EXAMPLE 20

Thirty-three and two-tenths grams of linseed oil (0.25 equivalent of ethylenic unsaturation) was used in place of the 0.25 equivalent of menhaden oil in Example 19. Fifty-seven and one-half mole percent of the ethylenic groups in the oil had vicinal methacryloxy and chloro substituents, 14.4 mole percent of the ethylenic groups in the oil were chloro allylic groups and 12 mole percent of the ethylenic groups in the oil had vicinal butoxy and chloro substituents. A copolymer with 33% by weight styrene was amber colored, transparent, hard and rigid.

EXAMPLE 21

A sample based on tung oil was prepared by the method of Example 19 using the same mole ratio of reactants. The product has 46.7 mole percent methacryloxychloro groups. A copolymer of the oil product with 33% styrene was a clear, light yellow, quite hard, rigid solid.

EXAMPLE 22

Four hundred and forty-five grams of methyl oleate (1.5 equivalents of ethylenic unsaturation) was used in place of the 1.5 equivalents of castor oil in Example 18. Analysis of the product showed that 60 mole percent of the ethylenically unsaturated groups in the ester now had vicinal methacryloxy and chloro substituents. A copolymer with 33% by weight styrene, which had been cured at 100% C. for 1 hour after the initial copolymerization at 65° C. for 3 hours, was quite tough and adhered to the aluminum mold.

EXAMPLES 23–31

A series of tall oil esters were reacted with tertiary butyl hypochlorite and methacrylic acid containing 0.05% p-methoxy phenol at 45° C. using a concentration of 1.7 moles of methacrylic acid, 1.0 mole tertiary butyl hypochlorite and sufficient tall oil ester to contain 1.0 equivalent of ethylenic unsaturation. A portion of the sample was stripped at 50° C. and 50 mm. pressure and a second portion was alkali extracted by the method of Example 1. Table 5 lists the characteristics of the tall oil esters which were prepared by conventional esterification techniques. Table 6 lists the characteristics of the haloacylated product and Table 7 lists the properties of a copolymer of the vacuum stripped reaction product with 33% by weight styrene.

*Table 5*

| Ex. | Tall Oil Fatty Acid Ester | Acidity, meq./g. | Sap., meq./g. | Hydroxyl, meq./g. | Unsat., meq./g. | Esters per Molecule | Vinylene Groups per Molecule |
|---|---|---|---|---|---|---|---|
| 23 | Benzyl | 0.03 | 2.82 | 0.10 | 3.74 | 1.0 | 1.32 |
| 24 | Cyclohexyl | 0.07 | 2.77 | 0.13 | 3.94 | 1.0 | 1.42 |
| 25 | Soybean Fatty Alcohol | 0.03 | 1.98 | 0.14 | 4.96 | 1.0 | 2.57 |
| 26 | 2-ethylhexyl | 0.06 | 2.55 | | 3.43 | 1.0 | 1.38 |
| 27 | Pentaerythritol | 0.02 | 3.35 | | 4.67 | 3.4 | 5.1 |
| 28 | Sorbitol | 0.01 | 3.29 | 0.25 | 4.71 | 4.2 | 6.0 |
| 29 | Ethylene | 0.02 | 3.41 | 0.0 | 4.77 | 1.7 | 2.35 |
| 30 | Furfuryl | 0.03 | 2.78 | | 6.65 | 1.0 | [1] 2.42 |
| 31 | Allyl | 0.06 | 3.17 | | 7.49 | 1.0 | [2] 2.36 |

[1] 1.40 equivalents in oil portion and 1.0 reactive equivalents in furfuryl portion.
[2] 1.36 equivalents in oil portion and 1.0 equivalents in allyl portion.

*Table 6*

| Example | Weight of Sample in Grams | Acidity In Meq./g. | Percent Ethylenic Groups in Ester Which Are— | | | Number of Acryloxy Groups Per Molecule |
|---|---|---|---|---|---|---|
| | | | Acryloxy-Chloro | Butoxy-Chloro | Allylic-Chloro | |
| 23 | A 765.8<br>B 666.0<br>C 526.0 | A 2.03<br>B 2.20<br>C 0.03 | 55.6 | 16.3 | 13.0 | 0.73 |
| 24 | A 761.8<br>B 687.0<br>C 532.0 | A 2.09<br>B 2.26<br>C 0.02 | 53.3 | 19.3 | 15.9 | 0.75 |
| 25 | A 687.8<br>B 590.0<br>C 419.0 | A 2.17<br>B 2.37<br>C 0.01 | 56.0 | 8.7 | 17.2 | 1.44 |
| 26 | A 685.2<br>B 600.0<br>C 488.0 | A 2.01<br>B 2.10<br>C 0.06 | 54.7 | 13.1 | 18.4 | 0.75 |
| 27 | A 705.0<br>B 611.0<br>C 478.0 | A 2.23<br>B 2.44<br>C 0.05 | 59.7 | 10.3 | 15.0 | 3.04 |
| 28 | A 702.8<br>B 617.0<br>C 472.0 | A 2.15<br>B 2.38<br>C 0.03 | 55.0 | 17.3 | 15.3 | 3.30 |
| 29 | A 714.1<br>B 604.0<br>C | A 2.08<br>B 2.28<br>C 0.02 | 70.0 | 2.0 | 14.8 | 1.64 |
| 30 | A 406.0<br>C | A 3.29<br>C 0.53 | | 3.24 | 19.3 | 0.52 |
| 31 | A 52.4<br>B 43.1 | A 2.18<br>B 2.33 | | 29.0 | | 0.86 |

As in the preceding examples, A designates the crude reaction product, B designates the vacuum stripped product and C designates the alkali washed product.

*Table 7*

| Styrene Copolymer of Example | Tall Oil Fatty Acid Ester | Percent Free Methacrylic Acid in Reaction Mixture | No. of Acryloxy Groups per Fatty Molecule | Polymer Properties |
|---|---|---|---|---|
| 23 | Benzyl | 12.6 | 0.73 | Hard, tough, slightly flexible. |
| 24 | Cyclohexyl | 12.9 | 0.75 | Do. |
| 25 | Soybean Fatty Alcohol. | 13.6 | 1.44 | Rigid, tough and hard. |
| 26 | 2-ethyl hexyl | 12.10 | 0.75 | Tough, flexible. |
| 27 | Pentaerythritol | 13.3 | 3.04 | Rigid, tough and hard. |
| 28 | Sorbitol | 13.6 | 3.30 | Do. |
| 29 | Ethylene | 13.1 | 1.64 | Hard, tough and slightly flexible. |
| 30 | Furfuryl | 13.3 | 0.52 | Polymerized in 32 hours to an easily tearible flexible polymer. |
| 31 | Allyl | 13.3 | 0.86 | Tough flexible. |

EXAMPLE 32

A commercially available soybean oil monoglyceride having 3.87 meq./g. of ethylenic unsaturation was haloacylated using the same conditions and proportions employed in the preceding nine examples. The product had 33.7 mole percent acryloxy-chloro groups, 23.5 mole percent butoxy-chloro groups, 14.3 allylic chloro groups and 0.45 acryloxy groups per molecule. A copolymer of the vacuum stripped product with 33% by weight styrene was hard, tough and slightly flexible.

EXAMPLE 33

This example illustrates a vicinal acryloxy-chloro soybean oil derivative made by reacting epoxidized soybean oil with acryl chloride. Twelve and one-half grams of epoxidized soybean oil containing 6.4% of oxirane oxygen was added dropwise with stirring at 25° C. to 4.53 grams of acrylyl chloride. The mixture, initially containing 0.05 mol. each of oxirane oxygen and acid chloride, was protected from atmospheric moisture. Thirty minutes later the oxirane oxygen content of the reaction mixture had dropped from the original value of 4.7% to 4.6%. The mixture was then heated for one hour at 80° C. This dropped the oxirane oxygen content to 3.24%. A second hour of heating at 80° C. lowered the oxirane oxygen content of the mixture to 2.16%. The reaction mixture was then heated for one-half hour at 100° C., cooled to 25° C., and analyzed for total acid value, oxirane oxygen, and saponification value. These values were respectively 0.91, 0.91, and 6.85 meq. per gram. Based on these analytical values, about 62% of the acrylyl chloride had reacted with the epoxidized soybean oil, about 81% of the epoxy groups had been cleaved and apparently 23% of the acrylyl was lost by evaporation during the reaction.

EXAMPLE 34

This example illustrates a vicinal acryloxy-chloro soybean oil derivative made by reacting epoxidized soybean oil with methacrylyl chloride. A mixture of 21 grams of methacryl chloride and 48.8 grams of epoxidized soybean oil containing 6.4% oxirane oxygen was heated to 80° C. in a glass flask equipped with stirrer, thermometer, and reflux condenser protected from atmospheric moisture. Initially the reaction mixture contained 0.2 mole each of oxirane oxygen and acid chloride. The reaction mixture was gradually heated from 80° C. to 120° C. over a three-hour period and then cooled to room temperature. The cooled reaction mixture was analyzed for acid chloride, oxirane oxygen and saponification value. The determinations were, respectively, 0.92, 0.28, and 7.24 meq. per gram. The analytical values indicate that about two-thirds of the methacrylyl chloride had reacted with the epoxidized soybean oil.

EXAMPLE 35

This example illustrates a vicinal acryloxy-chloro derivative of octyl esters of tall oil fatty acids made by reacting the mixed esters with acrylyl chloride. A mixture of 36.4 grams of the tall oil esters (0.1 mole of oxirane oxygen) and 9.0 grams of acrylyl chloride (0.1 mole) was gradually heated in a flask from room temperature to 114° C. over a period of about two hours. The reaction mixture was protected from atmospheric oxygen. The reaction mixture was then cooled to room temperature and analyzed for acid chloride, oxirane oxygen and saponification value. The analytical values were, respectively 0.71, 0.61, and 5.07 meq. per gram. They indicate that about 40% of the acrylyl chloride had reacted with the oxidized tall oil esters and about 27% of the acid chloride had evaporated from the reaction mixture.

EXAMPLE 36

This example illustrates the reaction of epoxy tall oil esters with methacrylyl chloride. A mixture of 36 grams of epoxidized tall oil octyl esters (0.1 mole of oxirane oxygen) and 12 grams of methacrylyl chloride (0.1 mole) was gradually heated to 110° C. over a period of about four hours. The reaction mixture was cooled and analyzed for acid chloride, oxirane oxygen, and saponification value. The analytical values were, respectively, 0.70, 0.15, and 5.94 meq. per gram. They indicate that about two-thirds of the methacrylyl chloride had reacted with the epoxy groups in the tall oil esters.

EXAMPLE 37

This example illustrates the preparation of a homopolymer from the reaction mixture of Example 34. Ten grams of the cooled reaction mixture was mixed with 0.1 gram of benzoyl peroxide dissolved in 0.3 gram of styrene, and heated for one hour at a temperature ranging from 70° to 80° C. The reaction mixture polymerized to a soft, pliable, water-clear solid material.

EXAMPLE 38

This example illustrates the preparation of a homopolymer from the reaction mixture of Example 34. Ten grams of the reaction mixture was mixed with 0.1 gram of benzoyl peroxide dissolved in 0.4 gram of styrene, and heated for one hour at 70°–80° C. The polymer thus produced was fairly hard, brown, and somewhat less pliable and soft than the homopolymer of the foregoing example.

EXAMPLE 39

This example illustrates the preparation of a homopolymer from the composition of Example 35. Ten grams of the reaction mixture was heated for one hour at 70°–80° C. with 0.1 gram of benzoyl peroxide dissolved in 0.3 gram of styrene. The resulting homopolymer was a clear, light yellow, soft and crumbly gel.

EXAMPLE 40

This example illustrates the preparation of a homopolymer from the composition of Example 36. Ten grams of the reaction mixture was heated for one hour at 70°–80° C. with 0.1 gram of benzoyl peroxide dissolved in 0.4 gram of styrene. The homopolymer resembled that produced in Example 37 except that its color was darker.

EXAMPLE 41

This example illustrates a vicinal methacryloxy-bromo derivative of soybean oil and styrene copolymer thereof, made by reacting epoxidized soybean oil with methacrylyl bromide.

(A) *Preparation of methacrylyl bromide.*—In a 300 ml. round bottom glass flask equipped with a condenser, thermometer, dropping funnel and mechanical stirrer is placed 59.6 grams (0.22 mole) of phosphorus tribromide. The flask is immersed in an ice-water bath. Methacrylic acid (43 grams, 0.5 mole) is added gradually to the stirred phosphorus tribromide through the dropping funnel over a two-hour period. The reaction mixture is stirred an additional five hours, during which time the temperature of the reaction mixture rises to about 40° C. The mixture is then allowed to stand for 16 hours in a refrigerator at 8° C. The phosphorus acid layer is separated from the methacrylyl bromide layer in a separating funnel, and the latter is then distilled under reduced pressure. Yield of main fraction boiling at 43.5–45.0° C. at 40 mm. Hg. pressure was 32 grams or 43% of theory.

(B) *Reaction of methacrylyl bromide with expoxidized soybean oil.*—Epoxidized soybean oil (30.5 grams, 0.134 mole of oxirane oxygen) is diluted with 15 grams of styrene and 0.033 gram of hydroquinone. The resulting clear mixture is heated to 98° C. on a boiling water bath. Methacrylyl bromide (9.7 grams, 0.065 mole) is added gradually to the stirred mixture of styrene and epoxidized soybean oil at 98° C. over a 1.5 hour period. At the end of this time, the oxirane oxygen content of the reaction mixture is reduced from an initial value of 3.88% by weight to 1.24% by weight, the acid value is 0.03 meq./gram, the saponification value is 3.93 meq./gram, and the total bromine content is 9.48% by weight. Styrene (5 grams) and benzoyl peroxide (0.97 gram) are added to the reaction mixture, which is then cast in a mold, heated therein for 16 hours at 65–68° C., removed from the mold and heated 0.5 hour at 125° C. The resulting copolymer is tough and flexible, having a tensile strength of 1850 pounds per square inch, a tensile modulus of 50,100 pounds per square inch, a flexural modulus of 6,000 pounds per square inch, a flexural strength of 2080 pounds per square inch, and a Clash-Berg elastic modulus $T_4$ value of 38° C.

EXAMPLE 42

This example illustrates a vicinal acryloxy-chloro derivative of octadecene-1 made by reacting octadecene-1 with acrylic acid and tertiary butyl hypochlorite. A mixture of octadecene-1 (126 grams, 0.5 mole) and acrylic acid (36.3 grams, 0.5 mole) containing 0.018 gram of p-methoxy phenol was heated to 60° C. in a glass flask equipped with condenser, thermometer, mechanical stirrer, and dropping funnel. Tertiary butyl hypochlorite (54.5 grams, 0.5 mole) was added slowly through the dropping funnel to the stirred mixture maintained at about 65° C. by external cooling. Stirring and holding the temperature at about 65° C. were continued until the reaction mixture gave a negative potassium iodide test for hypochlorite, a period of about 3.5 hours. A sample of the reaction mixture was removed and labelled "A." One-half of the remaining product was vacuum stripped at 55° C. and 12 mm. Hg pressure to remove by-product tertiary butyl alcohol and other volatile materials. The stripped residue was labelled "B." The other half of the initial reaction mixture was diluted with two volumes of ethyl ether. The ether solution was repeatedly washed with 25 ml. portions of a solution of 8 parts by weight of disodium hydrogen phosphate in 92 parts by weight of water until the ether solution was free of acid, and finally with 25 ml. portions of distilled water until free of phosphate. The washed ether solution was stabilized with 0.05 gram of paramethoxy phenol and then vacuum stripped at 65° C. and 25 mm. Hg pressure to remove the ethyl ether. The stripped product was labelled "C."

Calculations based on analyses of the A and C samples showed that 68% of the original vinylene groups in the octadecene-1 was converted to vicinal acryloxy-chloro groups, and 10% to vicinal tertiary butoxy-chloro groups. The remainder of the octadecene-1 was chlorinated.

Polymerization of the liquid "B" sample using 1% benzoyl peroxide and heating at 65° C. for 16 hours plus 120° C. for 0.5 hour produced a soft, rubber-like material.

EXAMPLE 43

(A) Methacrylic acid (117 g., 1.35 mole) containing 0.04 g., p-methoxyphenol and soybean oil (200 g., 1.00 mole of unsaturation) were mixed and heated to 65° C.; tertiary butyl hypochlorite (110 g., 1.00 mole) was added slowly with stirring to the methacrylic acid over a period of 3 minutes while controlling the exothermic reaction at 65–70° C. This temperature was maintained for an additional 90 minutes. The pressure was then reduced to 25 mm. Hg and while maintaining 65–70° C. and mixing vigorously the tertiary butyl alcohol by-product was removed by distillation.

The chemical and physical characteristics of the clear, pale yellow liquid product was as follows:

| | |
|---|---|
| Acidity (meq./g.) | 1.75 |
| Saponification (meq./g.) | 7.60 |
| Total chlorine (meq./g.) | 2.75 |
| Total vinyl unsaturation (meq./g.) | 3.35 |
| t-Butyl alcohol (wt. percent) | 0.5 |
| Refractive index ($n_D^{25}$) | 1.4725 |
| Brookfield viscosity (cp. @ 25° C.) | 730 |

(B) The foregoing vicinal acryloxy-chloro soybean oil derivative (66 parts) was combined with styrene (33 parts) and benzoyl peroxide (1 part), cast in a ⅛ inch sheet, and cured 16 hours at 65° C. and 0.5 hour at 110° C. The copolymer had the following physical characteristics:

| | |
|---|---|
| Flexural modulus (p.s.i.) | 302,000 |
| Flexural strength (p.s.i.) | 11,100 |
| Tensile strength (p.s.i.) | 7,300 |
| Elastic modulus (Clash-Berg $T_4$ ° C.) | 92 |
| Heat distortion (66 p.s.i., ° C.) | 82 |
| Barcol hardness, 935 | 75–69 |

EXAMPLE 44

The example illustrates a vicinal acryloxy-chloro soybean oil derivative made by reacting soybean oil with acrylic acid and chlorine. A mixture of soybean oil (58.8 grams, 0.30 mole of vinylene unsaturation), acrylic acid (43.2 grams, 0.60 mole), calcium acrylate (27.3 grams, 0.15 mole), tetramethylammonium chloride (0.33 gram, 0.003 mole), was reacted with chlorine gas (23.6 grams, 0.33 mole) which was added slowly over a period of 1.75 hours while maintaining 30–35° C. Solid material was removed from the reaction mixture by centrifuging. The clarified liquid material separated into two layers, the lower one being highly viscous and containing dissolved calcium acrylate. The upper oily layer was dissolved in ethyl ether and washed repeatedly with small portions of dilute aqueous sodium carbonate until free of acid, and then with distilled water until free of carbonate. The washed and dried oily product showed by analyses about 90% loss of original vinylene unsaturation, about 55% conversion of the original vinylene groups to vicinal methacryloxy-chloro groups and about 35% addition chlorination at the vinylene groups. Copolymerization of 53 parts by weight of the washed and dried product with 33 parts by weight of styrene and 14 parts by weight of acrylic acid, using benzoyl peroxide catalyst, gave a clear, yellow, flexible, solid material having fair strength.

EXAMPLES 45–54

The following Table No. 8 describes the gross appearance of copolymer castings formed from a vicinal methacryloxy-chloro soybean oil derivative. In each case 75 parts by weight of the soybean oil derivative prepared according to part A of Example 45 were combined with 25 parts of the specified comonomer and 2 parts by weight of benzoyl peroxide paste (a 50/50 mixture of benzoyl peroxide and tricresyl phosphate). Samples No. 3, 6, 7, and 8 were polymerized with 0.5 part of N,N-dimethylaniline at room temperature for about 4 hours, then postcured at 60° C. for 3 hours. All other samples were polymerized by heating at 70° C. for 16 hours followed by a postcure at 120° C. for 0.75 hour.

*Table 8*

| Example | Comonomer | Polymer Description |
| --- | --- | --- |
| 45 | Methyl Methacrylate | Clear, yellow, very hard, rigid, tough solid. |
| 46 | Ethyl Hexyl Acrylate | Clear, yellow, slightly flexible. |
| 47 | Vinyl Acetate | Clear, yellow, hard, slightly flexible somewhat brittle solid. |
| 48 | Dibutyl Fumarate | Clear, yellow, soft, brittle weak solid. |
| 49 | Lauryl Methacrylate | Clear, yellow, hard, brittle solid. |
| 50 | Acrylonitrile | Clear, pale brown, slightly flexible brittle solid. |
| 51 | Vinylidene Chloride | Clear, pale brown, hard, rigid, tough solid. |
| 52 | Isoprene | Clear, lavender, soft, flexible, weak solid. |
| 53 | Diallyl Phthalate | Clear, yellow, hard, rigid, tough solid. |
| 54 | Vinyl Crotonate | Do. |

I claim:

1. A polymerizable long-chain fatty compound having an aliphatic chain of from 10 to 24 carbon atoms and on said aliphatic chain vicinal acryloxy and halo substituents, said acryloxy substituent having the structure

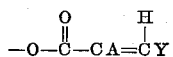

wherein Y is selected from the group consisting of hydrogen and

when Y is hydrogen, A is selected from the group consisting of hydrogen, halogen, alkyl of from 1 to 4 carbon atoms, alkoxy of from 1 to 4 carbon atoms, phenyl, benzyl and

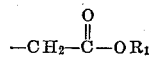

when Y is

A is selected from the group consisting of hydrogen, halogen and alkyl of from 1 to 4 carbon atoms, and $R_1$ is an organic radical of 1 to 18 carbon atoms.

2. A polymerizable long chain compound according to claim 1, wherein the acryloxy substituent conforms to the structure

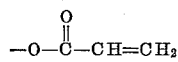

3. A polymerizable long chain compound according to claim 1, wherein the acryloxy substituent conforms to the structure

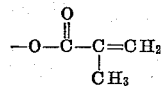

4. A polymerizable long chain compound according to claim 1, wherein the acryloxy substituent conforms to the structure

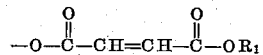

5. A polymerizable long chain compound according to claim 1, wherein the acryloxy substituent conforms to the structure

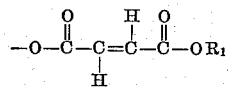

6. A polymerizable ester of the structure

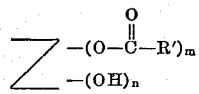

wherein Z is a radical of a hydroxy compound; $m$ is a number ranging from 1 to 6; $n$ is a number from 0 to 5; the sum of $m$ and $n$ ranges from 1 to 6, the number of hydroxyl groups in the original hydroxy compound; each R′ is independently a monovalent aliphatic chain of from 1 to 24 carbon atoms, at least one R′ being a monovalent aliphatic chain of from 10 to 24 carbon atoms containing vicinal acryloxy and chloro substituents, said acryloxy substituent having the structure

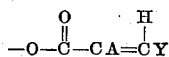

wherein Y is selected from the group consisting of hydrogen and

when Y is hydrogen, A is selected from the group consisting of hydrogen, halogen, alkyl of from 1 to 4 carbon atoms, alkoxy of from 1 to 4 carbon atoms, phenyl, benzyl and

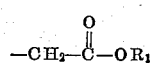

when Y is

A is selected from the group consisting of hydrogen, halogen and alkyl of from 1 to 4 carbon atoms, and $R_1$ is an organic radical of 1 to 18 carbon atoms.

7. A polymerizable long-chain fatty acid ester having an esterified fatty acid chain of from 10 to 24 carbon atoms wherein said aliphatic fatty acid chain contains vicinal acryloxy and halo substituents, said acryloxy substituent having the structure

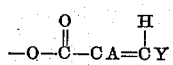

wherein Y is selected from the group consisting of hydrogen and

when Y is hydrogen, A is selected from the group consisting of hydrogen, halogen, alkyl of from 1 to 4 carbon atoms, alkoxy of from 1 to 4 carbon atoms, phenyl, benzyl and when Y is 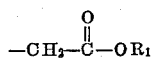

A is selected from the group consisting of hydrogen, halogen and alkyl of from 1 to 4 carbon atoms, and $R_1$ is an organic radical of 1 to 18 carbon atoms.

8. The compound of claim 7 wherein said long-chain fatty acid ester having an esterified fatty acid chain of from 10 to 24 carbon atoms is an ester of a tall oil fatty acid.

9. A polymerizable glyceride oil wherein at least one of the glyceride fatty acid chains has vicinal acryloxy and halo substituents, said acryloxy substituent having the structure $$-O-\overset{O}{\overset{\|}{C}}-CA=\overset{H}{\overset{|}{C}}Y$$

wherein Y is selected from the group consisting of hydrogen and

when Y is hydrogen, A is selected from the group consisting of hydrogen, halogen, alkyl of from 1 to 4 carbon atoms, alkoxy of from 1 to 4 carbon atoms, phenyl, benzyl and

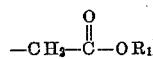

when Y is

A is selected from the group consisting of hydrogen, halogen and alkyl of from 1 to 4 carbon atoms, and $R_1$ is an organic radical of 1 to 18 carbon atoms.

10. A polymerizable glyceride oil according to claim 9 wherein the glyceride oil is soybean oil.

11. A polymerizable glyceride oil according to claim 9 wherein the glyceride oil is linseed oil.

12. A polymerizable glyceride oil according to claim 9 wherein the acryloxy substituent conforms to the structure $$-O-\overset{O}{\overset{\|}{C}}-\overset{H}{\overset{|}{C}}=\overset{}{\underset{H}{C}}-\overset{O}{\overset{\|}{C}}-OR_1$$

13. A polymerizable glyceride oil according to claim 12 wherein $R_1$ is isopropyl.

14. A polymerizable glyceride oil according to claim 12 wherein $R_1$ is 2-ethyl hexyl.

15. An addition polymer of the long-chain fatty compound of claim 1 wherein said addition polymer is polymerized through the ethylenic unsaturation of said acryloxy group.

16. The polymer of claim 15, wherein said adition polymer is a homopolymer.

17. An addition polymer of the long-chain fatty compound of claim 2 wherein said addition polymer is polymerized through the ethylenic unsaturation of said acryloxy group.

18. An addition polymer of the long-chain fatty compound of claim 3 wherein said addition polymer is polymerized through the ethylenic unsaturation of said acryloxy group.

19. An addition polymer of the long-chain fatty compound of claim 4 wherein said addition polymer is polymerized through the ethylenic unsaturation of said acryloxy group.

20. An addition polymer of the long-chain fatty compound of claim 5 wherein said addition polymer is polymerized through the ethylenic unsaturation of said acryloxy group.

21. An addition polymer of the long-chain fatty compound of claim 6 wherein said addition polymer is polymerized through the ethylenic unsaturation of said acryloxy group.

22. An addition polymer of the long-chain fatty compound of claim 7 wherein said addition polymer is polymerized through the ethylenic unsaturation of said acryloxy group.

23. An addition polymer of the long-chain fatty compound of claim 8 wherein said addition polymer is polymerized through the ethylenic unsaturation of said acryloxy group.

24. An addition polymer of the long-chain fatty compound of claim 9 wherein said addition polymer is polymerized through the ethylenic unsaturation of said acryloxy group.

25. An addition polymer of the long-chain fatty compound of claim 10 wherein said addition polymer is polymerized through the ethylenic unsaturation of said acryloxy group.

26. An addition polymer of the long-chain fatty compound of claim 11 wherein said addition polymer is polymerized through the ethylenic unsaturation of said acryloxy group.

27. An addition polymer of the long-chain fatty compound of claim 12 wherein said addition polymer is polymerized through the ethylenic unsaturation of said acryloxy group.

28. An addition polymer of the long-chain fatty compound of claim 13 wherein said addition polymer is polymerized through the ethylenic unsaturation of said acryloxy group.

29. An addition polymer of the long-chain fatty compound of claim 14 wherein said addition polymer is polymerized through the ethylenic unsaturation of said acryloxy group.

References Cited by the Examiner

UNITED STATES PATENTS

| | | | |
|---|---|---|---|
| 2,054,814 | 9/1936 | Harford | 260—469 |
| 2,129,722 | 9/1938 | Woodhouse | 260—89.5 |
| 2,141,546 | 12/1938 | Strain | 260—405 |
| 2,511,870 | 6/1950 | Oroshnik | 260—497 |
| 2,514,672 | 7/1950 | Reynolds et al. | 260—484 |
| 2,728,781 | 12/1955 | Shokal et al. | 260—18 |
| 2,947,766 | 8/1960 | Riener | 260—405 |
| 3,010,925 | 11/1961 | Lynn | 260—23 |
| 3,125,592 | 3/1964 | Nevin | 260—23 |

OTHER REFERENCES

"Peracetic Acid and Derivatives," Union Carbide Chemicals Co. (1957), page 18.

LEON J. BERCOVITZ, *Primary Examiner.*

DONALD E. CZAJA RONALD W. GRIFFIN, C. WARREN IVY, *Assistant Examiners.*

UNITED STATES PATENT OFFICE
CERTIFICATE OF CORRECTION

Patent No. 3,255,133                                        June 7, 1966

Charles S. Nevin

It is hereby certified that error appears in the above numbered patent requiring correction and that the said Letters Patent should read as corrected below.

Column 2, lines 67 to 72, for that portion of the formula reading:

column 4, line 65, the formula should appear as shown below instead of as in the patent:

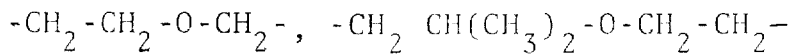

column 6, lines 35 to 39, for the right-hand portion of the formula reading:

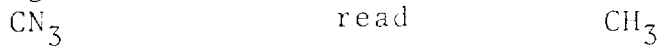

column 10, line 15, for "strentgh" read -- strength --; line 33, for "unsaturation" read -- unsaturation) --; column 11, line 62, for "552%" read -- 55.2% --; column 12, line 11, for "than" read -- that --; column 13, line 14, for "mething" read -- method --; column 16, line 14, for "100%C" read -- 100° C --; column 17, line 58, for "acrylyl was" read -- acrylyl chloride was --; column 18, line 56, for "the reaction mixture of Example 34" read -- the composition of Example 33 --; line 65, for "pilable" read -- pliable --.

Signed and sealed this 24th day of October 1967.

(SEAL)
Attest:

EDWARD M. FLETCHER, JR.                        EDWARD J. BRENNER
Attesting Officer                               Commissioner of Patents